(12) United States Patent
Avegliano et al.

(10) Patent No.: US 11,593,821 B2
(45) Date of Patent: Feb. 28, 2023

(54) MOBILE DEVICE BASED INVENTORY MANAGEMENT AND SALES TRENDS ANALYSIS IN A RETAIL ENVIRONMENT

(71) Applicant: INTERNATIONAL BUSINESS MACHINES CORPORATION, Armonk, NY (US)

(72) Inventors: Priscilla Barreira Avegliano, Sao Paulo (BR); Sergio Borger, Sao Paulo (BR); Carlos Henrique Cardonha, Sao Paulo (BR); Ricardo Guimaraes Herrmann, Sao Paulo (BR); Cesar Kawabata, Sao Paulo (BR); Andrea Britto Mattos, Sao Paulo (BR); Daniel Alves Da Silva, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1828 days.

(21) Appl. No.: 14/622,360

(22) Filed: Feb. 13, 2015

(65) Prior Publication Data

US 2015/0235157 A1     Aug. 20, 2015

Related U.S. Application Data

(60) Provisional application No. 61/939,782, filed on Feb. 14, 2014.

(51) Int. Cl.
*G06Q 10/06*     (2012.01)
*G06Q 10/08*     (2012.01)
(Continued)

(52) U.S. Cl.
CPC ....... *G06Q 30/0202* (2013.01); *A47F 5/0043* (2013.01); *G06Q 10/06315* (2013.01); *G06Q 10/087* (2013.01)

(58) Field of Classification Search
None
See application file for complete search history.

(56) References Cited

U.S. PATENT DOCUMENTS

| 4,797,819 A | 1/1989 | Dechirot |
| 5,493,107 A | 2/1996 | Gupta et al. |
| (Continued) | | |

FOREIGN PATENT DOCUMENTS

| EP | 1 036 370 | 9/2000 |
| EP | 2 544 971 | 1/2013 |
| (Continued) | | |

OTHER PUBLICATIONS

Urban, Timothy L.; Inventory models with inventory-level-dependent demand; May 2005; Elsevier; European Journal of Operational Research, vol. 162, Issue 3; pp. 792-804 (Year: 2005).*

(Continued)

*Primary Examiner* — Eric W Stamber
*Assistant Examiner* — Ashley Y Young
(74) *Attorney, Agent, or Firm* — F. Chau & Associates, LLC

(57) ABSTRACT

A method for calculating sales trend of a product at a store shelf based on crowdsourcing, includes receiving, by a retail store server, availability data of a product measured on a shelf in the retail store from a portable device, where the availability data is in the form of a picture acquired of the product on the shelf, identifying products on the shelf using tags attached to the shelves, calculating sales velocity and sales trends of the product from the identified products, and transmitting the sales velocity and sales trend of the product to one or more third parties' systems in a supply chain of said retail store. Products and their locations on retail store shelves have been cataloged in a product database.

6 Claims, 8 Drawing Sheets

(51) Int. Cl.
    *G06Q 30/0202*    (2023.01)
    *G06Q 10/0631*    (2023.01)
    *G06Q 10/087*     (2023.01)
    *A47F 5/00*        (2006.01)

(56) References Cited

U.S. PATENT DOCUMENTS

| | | | |
|---|---|---|---|
| 6,341,269 B1 | 1/2002 | Dulaney et al. | |
| 7,100,824 B2 | 9/2006 | Ostrowski et al. | |
| 7,168,618 B2 | 1/2007 | Schwartz | |
| 7,240,027 B2 | 7/2007 | McConnell et al. | |
| 7,245,221 B2 | 7/2007 | Claudatos et al. | |
| 7,356,495 B2 | 4/2008 | Beigl et al. | |
| 7,392,948 B2 | 7/2008 | Smith et al. | |
| 7,493,336 B2 | 2/2009 | Noonan | |
| 7,699,226 B2 | 4/2010 | Smith et al. | |
| 7,896,244 B2 | 3/2011 | McCormick | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,266,020 B2 | 9/2012 | Young | |
| 8,321,302 B2 | 11/2012 | Bauer et al. | |
| 8,321,303 B1 * | 11/2012 | Krishnamurthy | 705/28 |
| 8,335,722 B2 | 12/2012 | Lee et al. | |
| 8,401,914 B1 | 3/2013 | Kim | |
| 8,401,915 B1 | 3/2013 | Kim | |
| 8,403,215 B2 | 3/2013 | Aihara et al. | |
| 2002/0174001 A1 | 11/2002 | Henry | |
| 2006/0164247 A1 | 7/2006 | Overhultz et al. | |
| 2006/0214792 A1 | 9/2006 | Goyal et al. | |
| 2007/0016494 A1 | 1/2007 | Brown et al. | |
| 2007/0061210 A1 | 3/2007 | Chen et al. | |
| 2007/0112651 A1 | 5/2007 | Swan et al. | |
| 2009/0030773 A1 | 1/2009 | Kamhoot | |
| 2009/0063307 A1 | 3/2009 | Groenovelt et al. | |
| 2009/0125411 A1 | 5/2009 | Otto et al. | |
| 2009/0248198 A1 | 10/2009 | Siegel et al. | |
| 2010/0010868 A1 | 1/2010 | Aimone Catti | |
| 2010/0234986 A1 | 9/2010 | Clopton et al. | |
| 2011/0173082 A1 * | 7/2011 | Breitenbach | G06Q 10/06311 705/16 |
| 2012/0233003 A1 | 9/2012 | Calman et al. | |
| 2013/0036043 A1 | 2/2013 | Faith | |
| 2013/0080289 A1 | 3/2013 | Roy et al. | |
| 2013/0090984 A1 | 4/2013 | Solheim et al. | |
| 2013/0179226 A1 | 7/2013 | Adams et al. | |
| 2013/0264388 A1 | 10/2013 | Grimlund et al. | |
| 2013/0282522 A1 | 10/2013 | Hassan | |
| 2014/0143039 A1 * | 5/2014 | Branton | G06Q 30/0223 705/14.24 |
| 2015/0019391 A1 | 1/2015 | Kumar et al. | |
| 2015/0049902 A1 * | 2/2015 | Moraleda | G06K 9/6263 382/103 |
| 2019/0318417 A1 * | 10/2019 | Gumaru | G06Q 30/0635 |

FOREIGN PATENT DOCUMENTS

| | | |
|---|---|---|
| WO | WO 99/21115 | 4/1999 |
| WO | WO 02/41110 A2 | 5/2002 |
| WO | WO 2006/028952 | 3/2006 |
| WO | WO 2006/055667 | 5/2006 |
| WO | WO 2007/030821 | 3/2007 |
| WO | WO 2011/113053 | 9/2011 |
| WO | WO 2013/032697 | 3/2013 |

OTHER PUBLICATIONS

Office Action for U.S. Appl. No. 14/750,981 dated Sep. 25, 2019.
Final Office Action for U.S. Appl. No. 14/750,981 dated Mar. 19, 2020.

* cited by examiner

MOBILE DEVICE BASED INVENTORY MANAGEMENT AND SALES TRENDS ANALYSIS IN A RETAIL ENVIRONMENT

CROSS REFERENCE TO RELATED UNITED STATES APPLICATIONS

This application claims priority from U.S. Provisional Application No. 61/939,782 of Avegliano, et al., filed Feb. 14, 2014, the contents of which are herein incorporated by reference in their entirety.

BACKGROUND

1. Technical Field

Embodiments of the present disclosure are directed to mobile-based technologies for the retail industry.

2. Discussion of the Related Art

Retailers, consumer packaged goods (CPGs) companies, and manufacturers face many challenges, such as frequent out-of-shelf and out-of-stock conditions, and poor demand forecasts, that generate inefficient production, excessive inventory or out-of-stocks conditions, that clearly leads to lost sales. The process of sales estimation is crucial to a supply chain. A poor demand forecast may frequently cause a bullwhip effect to occur, which can result in inefficient production, excessive inventory or out-of-stock condition, that can lead to lost sales. It is known that visibility of customer demand is essential for a better supply chain performance.

Manufacturers, consumer goods companies and producers (MCP) typically have little to no real time visibility on consumption and consumption speed information of their products at distribution points and the retailer shelf. Among others, the consequences include 8% out-of-shelf situations that represent about a 3.9% sales loss. For MCP enterprises this may also include possible brand loyalty loss as well as issues with product planning, merchandizing, advertizing and new product introduction. On the other hand, today's consumers have a wide variety of mobile information tools that allow them to verify price and availability of products in the majority of online stores, making shelf information important to future MCP enterprises.

Demand estimation is another important challenge in retail industry. Even though the task is of unquestionable economical relevance, current forecast models cannot be considered satisfactory for most practical scenarios. It is interesting to notice, though, that demand fluctuations caused by out-of-shelf events have been overlooked so far. Incidents of this type happen not only when products are out-of-stock, but also when retailers employ poor shelf replenishment practices and do not have their products properly organized in the store. Out-of-shelf events clearly lead to immediate sales losses, but their side effects are much more profound: since there is no record of unmet demand, a silent deformation of the demand curve is produced. As a result, forecast models are inevitably inaccurate, as they are based on misleading data, resulting in more out-of-shelf events; hence, a vicious cycle arises.

Out-of-the-shelf conditions are also a delicate situation, since they represent an impact on sales. When faced with an out-of-the-shelf situation, a consumer might take one of these actions: (1) buy a similar product from other brand; (2) leave the store and look for the desired product on another store, or (3) do not buy the desired product at all. From the store's perspective, option (1) might not have a negative impact because a sale was made, but from a CPG's perspective, option (1) might be considered the most dangerous option since the consumer might try the competitor's product and prefer it. On the other hand, options (2) and (3) represent a sale loss to the store and to CPG, respectively. Consequently, out-of-the-shelf conditions should be minimized as much as possible. This situation can occur if the product is out-of-stock or simply if the shelf replenishment was not made satisfactorily.

Shelf monitoring in supermarkets is necessary in order to avoid situations such as items going out of stock. Monitoring products in supermarket is an intensive work typically performed by the employees.

In a vendor-managed inventory (VMI) business model, the vendor supplier is responsible for maintaining an agreed level of products in stock. In some countries, such as in Brazil, this responsibility is extended to the task of shelf-replenishment: there are employees of the CPG inside the store transporting items from the backroom stock to the shelves. In this context, the determination of how many products should be replaced at each period of the day and with what frequency is determined by the CPG's employees who do not have access to point-of-sale (POS) information or have permission to make structural changes in the store's facility.

One of the main reasons why even the most sophisticated analytics and optimization tools have not been able to properly address the problem is the unsatisfactory (and actually almost inexistent) amount of information related to these events and to the status of shelves over time.

There are some solutions that are aimed at monitoring the level of backroom stocks and the number of items disposed in the shelves, but they are primarily based on information of sales collected from POS or on solutions that demand infrastructure's modifications, such as the use of an RFID, which demands the installation of a RFID reader, or with presence sensors on the shelves, and image processing techniques that load product templates and try to determine if each product is displayed in the input picture.

Specialized sensors may have high cost and be challenging to obtain and install. On the other hand, image processing is a low cost solution that can be implemented using pictures taken from any kind of mobile device. However, previous methods either require a planogram (a planogram is an organization of the assortment on a shelf) of the current shelf, or try to match all products templates from the store against the picture.

Therefore, an additional solution using image processing can allow a fully automatic procedure in which the user does not have to provide a planogram, but can obtain an identification with high accuracy and speed by taking a picture of a shelf rack, matching only templates of products from the assortment of the current shelf. This list of products can retrieved automatically from tagged shelves. Shelf monitoring and product replacement can also be made more efficient using mobile devices.

SUMMARY

According to an embodiment of the disclosure, there is provided a method for calculating sales trend of a product at a store shelf based on crowdsourcing, including receiving, by a retail store server, availability data of a product measured on a shelf in the retail store from a portable device, wherein the availability data is in the form of a picture acquired of the product on the shelf, identifying products on the shelf using tags attached to the shelves, calculating sales velocity and sales trends of the product from the identified products, and transmitting the sales velocity and sales trend of the product to one or more third parties' systems in a supply chain of said retail store, where products and their locations on retail store shelves have been cataloged in a product database.

According to a further embodiment of the disclosure, the method includes triggering a warning message if the retail store shelf is empty.

According to a further embodiment of the disclosure, identifying products on the shelf using tags includes identifying the tags on the shelves using tag template information and information regarding a distribution of tags on the retail store shelves that is read from a tag database, mapping the identified tags to a shelf and its corresponding assortment of items, identifying products in the picture by reading product templates related to the identified tags from the product database, and transmitting a list of identified products and their quantities to the server.

According to a further embodiment of the disclosure, identifying the tags is performed by a first image processing application, and identifying products in the picture is performed by a second image processing application.

According to a further embodiment of the disclosure, the method includes filtering the results of identified products based on product dimensions, to eliminate false positives.

According to a further embodiment of the disclosure, where calculating sales velocity and sales trends of the product includes receiving for each product p a timestamp t and a number of items n of product p on the retail store shelf, where the product information is organized as pairs p(t, n), ordering product pairs p(t, n) according to the timestamp t to generate an ordered sequence, calculating a least square line fit for the sequence to estimate a sales' velocity, and comparing changes in a slope of the fitted line fits to determine a change in the sale's velocity over time.

According to a another embodiment of the disclosure, there is provided a method for minimizing a products out-of-the-shelf time based on data collected by mobile applications, including receiving, by a retail store server, data acquired by a mobile application regarding a number of missing product items on a shelf in the retail store, calculating the product's turnover, receiving, by the retail store server, a request for an optimized replenishment route, generating an optimized replenishment route from the products' turnover calculation that minimizes out-of-the-shelf occurrences, and transmitting the optimized replenishment route to the mobile application for display to a user.

According to a further embodiment of the disclosure, the product's turnover is calculated by a first sales trend calculation application.

According to a further embodiment of the disclosure, the method includes updating demand forecasts of the reported missing product items in a product localization and turnover database.

According to a further embodiment of the disclosure, the optimized replenishment route is calculated by a second sales trend calculation application.

According to a further embodiment of the disclosure, the data of a number of missing product items on a shelf acquired by the mobile application is in the form of a picture, where products and their locations on retail store shelves have been cataloged in a product database. The method includes identifying products on the shelf using tags attached to the shelves.

According to a further embodiment of the disclosure, identifying products on the shelf using tags includes identifying the tags on the shelves using tag template information and information regarding a distribution of tags on the retail store shelves that is read from a tag database, mapping the identified tags to a shelf and its corresponding assortment of items, identifying products in the picture by reading product templates related to the identified tags from the product database, and transmitting a list of identified products and their quantities to the server.

According to a further embodiment of the disclosure, identifying the tags is performed by a first image processing application, and identifying products in the picture is performed by a second image processing application.

According to a further embodiment of the disclosure, the method includes the results of identified products based on product dimensions, to eliminate false positives.

According to a another embodiment of the disclosure, there is provided a non-transitory program storage device readable by a computer, tangibly embodying a program of instructions executed by the computer to perform the method steps for managing inventory and sales trends in a retail environment using mobile devices. The method includes receiving, by a retail store server, product availability data acquired by a mobile application regarding a number of missing product items on a shelf in the retail store, wherein availability data is in the form of a picture acquired of the product on the shelf, identifying products on the shelf using tags attached to the shelves, calculating turnover, sales velocity and sales trends of the identified products, transmitting the sales velocity and sales trend of the product to one or more third parties' systems in a supply chain of said retail store, receiving, by the retail store server, a request for an optimized replenishment route, generating an optimized replenishment route from the products' turnover calculation that minimizes out-of-the-shelf occurrences, and transmitting the optimized replenishment route to the mobile application for display to a user, where products and their locations on retail store shelves have been cataloged in a product database.

According to a further embodiment of the disclosure, the method includes triggering a warning message if the retail store shelf is empty.

According to a further embodiment of the disclosure, identifying products on the shelf using tags includes identifying the tags on the shelves using tag template information and information regarding a distribution of tags on the retail store shelves that is read from a tag database, mapping the identified tags to a shelf and its corresponding assortment of items, identifying products in the picture by reading product templates related to the identified tags from the product database, and transmitting a list of identified products and their quantities to the portable device.

According to a further embodiment of the disclosure, calculating sales velocity and sales trends of the product includes receiving for each product p a timestamp t and a number of items n of product p on the retail store shelf, where the product information is organized as pairs p(t, n), ordering product pairs p(t, n) according to the timestamp t to generate an ordered sequence, calculating a least square line fit for the sequence to estimate a sales' velocity, and comparing changes in a slope of the line fits to determine a change in the sale's velocity over time.

According to a another embodiment of the disclosure, there is provided a system to calculate sales trend of a product at a store shelf based on crowdsourcing, including at least one portable application configured to be executed on a plurality of portable computing devices, a plurality of tags attached to each store shelf rack, and a retail store server connected to the portable application on each of the plurality of portable computing devices over a wireless local network, where availability data of a product is measured on each store shelf rack by the at least one portable application using the tags attached to each store shelf rack, and the retail store server is configured to determine sales trends of the product from the availability data received from the at least one portable application over the wireless local area network.

DETAILED DESCRIPTION

Figure 1:
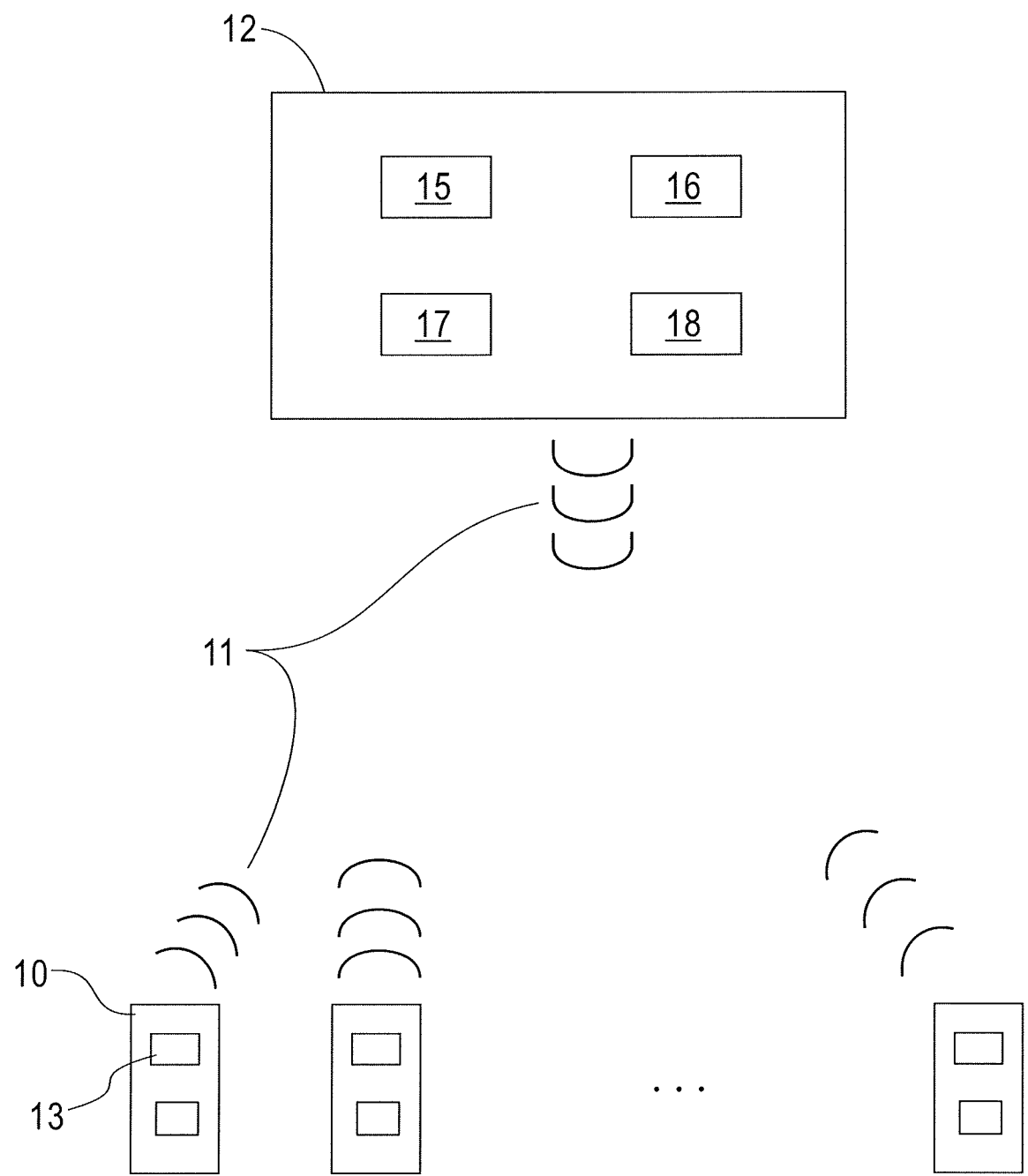
FIG. 1 is a schematic block diagram of a system according to an embodiment of the disclosure.

Exemplary embodiments of the disclosure as described herein generally include systems and methods for managing inventory and analyzing sales trends in a retail environment using mobile devices. Accordingly, while embodiments of the disclosure are susceptible to various modifications and alternative forms, specific embodiments thereof are shown by way of example in the drawings and will herein be described in detail. It should be understood, however, that there is no intent to limit embodiments of the disclosure to the particular exemplary embodiments disclosed, but on the contrary, embodiments of the disclosure cover all modifications, equivalents, and alternatives falling within the spirit and scope of the disclosure.

Embodiments of the present disclosure can provide a crowd sourced-based solution to monitor sales velocity in retail stores. An exemplary crowdsourced based data collection solution according to an embodiment of the disclosure can measure product availability on the shelf based on portable devices, not RFIDs or sensors, and can send sales trend analyses, such as sales velocity and sales acceleration, to manufacturers, that can prevent the bullwhip effect. Two kinds of mobile applications can be used: one, designed for stockists, can be used to collect data regarding the number of products in the shelf and turnover of products in a period of time; and another for consumers can be used to report that a product is missing on the shelf. The collected data can be analyzed and information regarding sales velocity and sales trends can be extracted and transmitted to the whole supply chain. Exemplary embodiments of the disclosure can be used anywhere without infrastructure intervention and are capable of registering unattended demand.

Further exemplary embodiments of the present disclosure can provide a decision-support platform for supply-chain activities of MCP enterprises that includes a mobile application object recognition algorithm to augment the content being produced by merchants, and of a series of analytics modules, based on image processing, multi-agent simulation, optimization, statistics, and visual analytics, that use statistical analysis to estimate sales velocity and predict out-of-shelf conditions to generate tailored recommendations. A visualization component presents information about sales velocity, predictive estimation of probable out-of-shelf conditions, and recommendations to prevent their occurrence. To leverage the content being captured by workers using the mobile application, embodiments of the disclosure support image-processing algorithms in tasks such as identifying objects as well as their absence on retailers' shelves. Embodiments of the disclosure can minimize the time of out-of-the-shelf situations by generating an optimized route and schedule of items' replenishment, based on information of items' turnover collected by a mobile application.

A mobile application, deployed on customers and merchant devices to periodically monitor product sales velocity, can reduce the high communication latency between the distribution point and retail stores under out-of-shelf condition and suppliers. A platform according to an embodiment of the disclosure can consider the impact of out-of-shelf events on demand estimation. Current analytics and optimization solutions cannot address this task properly due to the lack of real-time information about events and activities related to shelves, as data coming from points-of-sale provide a partial picture of the whole process.

According to embodiments of the disclosure, multi-agent simulations were used in the investigation of out-of-shelf events on demand forecasts and to support test replenishment and ordering techniques that could be potentially used by retailers. Results show that out-of-shelf events indeed have an important impact in demand forecast.

Optimization and visualization have the potential to further improve the quality of a platform according to an embodiment of the disclosure. For example, techniques dedicated to the Vehicle Routing Problem can employ knowledge about sales velocity to generate replenishment for merchants. Similarly, scenarios with several retailers and several producers may have distribution plans properly modeled as Multi-commodity Flow problems.

Further embodiments of the disclosure can receive a user-supplied picture of a supermarket shelf rack that contains tags, and can identify the tagged shelves and each product displayed in the picture. A solution according to an embodiment of the disclosure is fully automatic, does not require a planogram, and can identify with high accuracy and speed, matching only templates of products from the assortment of the current shelf. This list of products can be retrieved automatically from tagged shelves.

A method according to an embodiment of the disclosure can receive an image of a tagged shelf rack and can identify the products displayed in the picture, using image processing. The tags are identified, retrieving the shelf assortment of items and this information is used to match only templates from the products of the current shelf. Also, knowing the distance between the tags in the picture and in the actual shelf, can help the product identification method.

A method according to an embodiment of the disclosure, being a low cost solution, does not require specialized sensors. A method according to an embodiment of the disclosure, by retrieving its list of products from the tags, does not require that a user manually identify the current shelf. Also, a method according to an embodiment of the disclosure does not have to match all products templates from the store. Finally, the scale information that can be computed from known distances between the tags can increase the identification accuracy and provide additional information, such as estimating the shelf row in which a product is identified.

The insight provided by the optimization analytics will allow MCP enterprises to better plan product introduction, manufacturing and distribution based on the information collected by merchants and consumers about the product availability and cost at point of distribution or retail shelf. Further the image processing information added allows an MCP enterprise to "see" the status of product placement, organization thus allowing MCP to create and control consumer oriented merchandizing strategies at the shelf.

Timely (near real time) information about product availability and consumption speeds and trends has always been a desire of MCP enterprises. Embodiments of the disclosure can address supply chain visibility and optimization for MCP enterprises using merchants and crowdsourced information at the point of distribution or retail shelf by using mobile social networking technologies to collect information to forecast out-of-stock situations at the shelf for consumers without depending on point of sale information. Further, the addition of image processing capabilities allows for opportunities for an MCP enterprise to create and control consumer oriented merchandizing strategies at the shelf towards optimizing customer experience.

A system according to an embodiment of the disclosure can calculate sales trend at the shelf based on a crowdsourcing portable application, identify products on tagged shelves based on image processing, and minimize out-of-the-shelf products based on data collected by mobile applications in a vendor inventory management model. FIG. 1 is a schematic block diagram of a system according to an embodiment of the disclosure. A system according to an embodiment of the disclosure includes a plurality of mobile devices 10 provided to stockists, a network 11, a retail store server 12, one or more applications 13 installed on each mobile device, and one or more databases 15, 16. In the drawing figure, only one mobile device 10 with one application 13, and one mobile wireless network signal 11 are labeled, for clarity. The network 11 may be local wireless network such as a WiFi network, a 3G network, a 4G network, etc. A system according to an embodiment of the disclosure may also include a set of tags that will be attached to each store shelf rack. The mobile devices may include devices possessed by customers. Applications that may be installed on the mobile device include a camera application to acquire pictures, an application to acquire data of products' turnover in a store, and an application to request an optimal replenishment route. In some embodiments, the applications to acquire product turnover data may be the camera application. The retail store server 12 may be further provided with an image processing module 17 and a sales trend calculation module 18. The image processing module 17 may include a first app that can identify tags, and a second app that can identify products. The sales trend calculation module 18 may include a first app that can calculate a product's turnover, and a second app that can determine an optimized product replenishment route. The databases may include a first database 15 that stores product and tag distribution templates containing the product name, picture and dimensions, and a second database 16 that stores information about product localization and turnover. The system may further include an application that can trigger a warning message if an empty shelf is reported. A system according to an embodiment of the disclosure may also be connected to systems in the supply chain of the store over a computer network such as the Internet.

Figure 2:
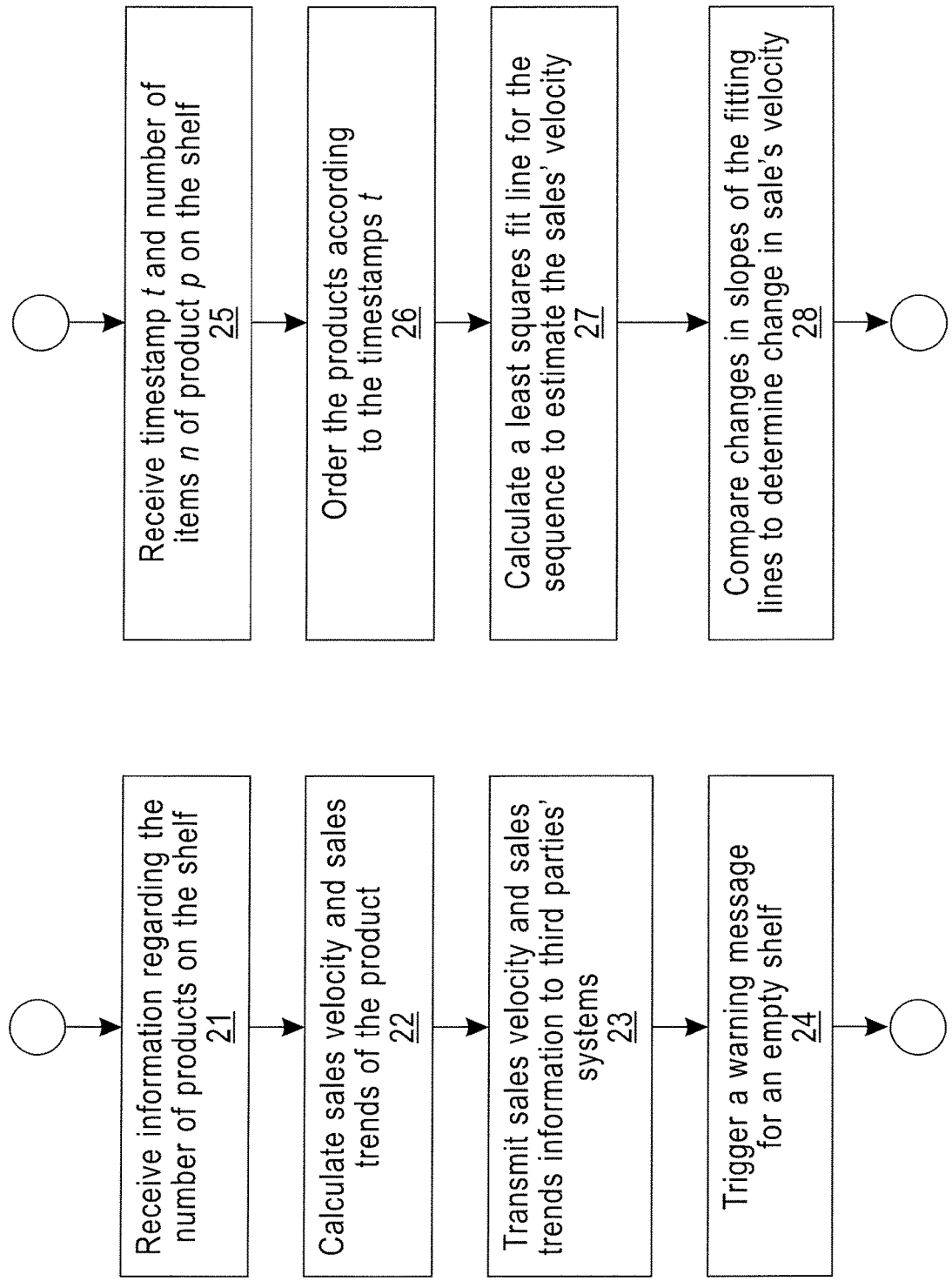
FIG. 2A is a flowchart of a method for calculating sales trend at the shelf based on a crowdsourcing portable application, according to an embodiment of the disclosure.
FIG. 2B is a flowchart of an exemplary method for calculating the sales trend of a product's demand, according to an embodiment of the disclosure.

FIG. 2A is a flowchart of an exemplary method according to an embodiment of the disclosure for calculating sales trend at the shelf based on a crowdsourcing portable application. A method according to an embodiment of the disclosure assumes that an application is installed on stockists' and customers' portable devices. Referring now to the figure, such a method includes the retail store server receiving at step 21 information regarding the number of products on the shelf from the portable devices and calculating at step 22 sales velocity and sales trends of the product. The retail store server can transmit sales velocity and sales trend information to third parties' systems involved in the supply chain at step 23. If the information received from the portable devices indicates an empty shelf, a warning message can be triggered at step 24.

FIG. 2B is a flowchart of an exemplary method according to an embodiment of the disclosure for calculating the sales trend of a product's demand based on its turnover in the retail store and on the reported sales loss communicated by a customer that did not find the desired product. This calculation would be performed by the sales trend calculation module 18 on the retail store server 12 of FIG. 1. Referring now to the figure, such a method includes, at step 25, receiving for each product p a timestamp t and a number of items n of product p on the shelf, where the product information is organized as pairs p(t, n). At step 26, the product pairs are ordered according to the timestamps to generate an ordered sequence. Then, a least squares fitting line is calculated for the sequence at step 27 to estimate the sales' velocity. At step 28, the changes in the slope of the fitting line are compared with past fitting lines to see if sale's velocity is changing over time, and, if yes, how it is changing.

As an exemplary, non-limiting scenario of calculating sales trend at the shelf based on a crowdsourcing portable application, consider the following. A stockist courses through a store and registers in the mobile application the initial number of products on the shelves and the number of missing products. The product registration can be accomplished by, for example, processing a photograph taken by the stockiest. The system installed on the retail store server, based on the collected data, updates information regarding sales velocity and sales trends and sends, via the Internet, the new calculated values to other parties involved in the supply chain. The stockist replenishes the shelf and again registers the number of replenished products through the mobile application. Then, after a few hours, a consumer reports via the mobile application that the product is missing in the shelf. The server system then updates the information regarding sales velocity and sales trends of the product and sends, via Internet, the new calculated values to other parties involved in the supply chain. In addition, a warning signal for replenishing the shelf can be triggered. The stockist can then replenish the shelf and register the number of replenished products through the mobile application.

A system according to an embodiment of the disclosure for identifying products on tagged shelves includes a set of tags that will be attached to each shelf rack. The tags can be a low cost paper models, each with a distinctive pattern. A predetermined number of tags are placed in a shelf rack and the tags themselves and distances between the tags are recorded. The tags may be distributed so that whenever a picture of a shelf is taken, at least k tags are displayed in the picture. An exemplary, non-limiting value of k is 3. An exemplary, non-limiting system also includes the first database 15 of product templates that include, inter alia, the product name, picture and dimensions, and tag templates and their distribution on the store shelves. Thus, a set of items can be mapped to a shelf, and each set of tags is mapped to a shelf, to define which products are displayed in a rack of shelves. An exemplary, non-limiting system further includes a camera application on the mobile devices that can take pictures of the shelves and transmit them to the server. These pictures may record the tags and their separation distances. An exemplary, non-limiting server includes a first image processing application to identify the tags and a second image processing application to identify the products.

A method according to an embodiment of the disclosure for identifying products on tagged shelves is based on image processing and uses the database of products templates that include each product's picture and dimensions, the database of tag templates and their distribution on the shelves, and the tags themselves placed at each shelf rack of a retail store. Each set of tags, whose location is known, can be mapped to a shelf and its corresponding assortment of items. A picture is acquired by the mobile device of one shelf in which at least k tags are visible. The tags can be recognized by the first image processing application, so that the current shelf can be identified and its assortment retrieved, as well as estimating the picture scale and correcting perspective distortion. With this information, it can be determined what products templates should be identified in the image. Products belonging to other shelves that are in incorrect positions are not identified. According to an embodiment of the disclosure, the second image processing application can be used to match templates in the input picture using dimension information to increase recognition accuracy and to filter false positives.

Figure 3:
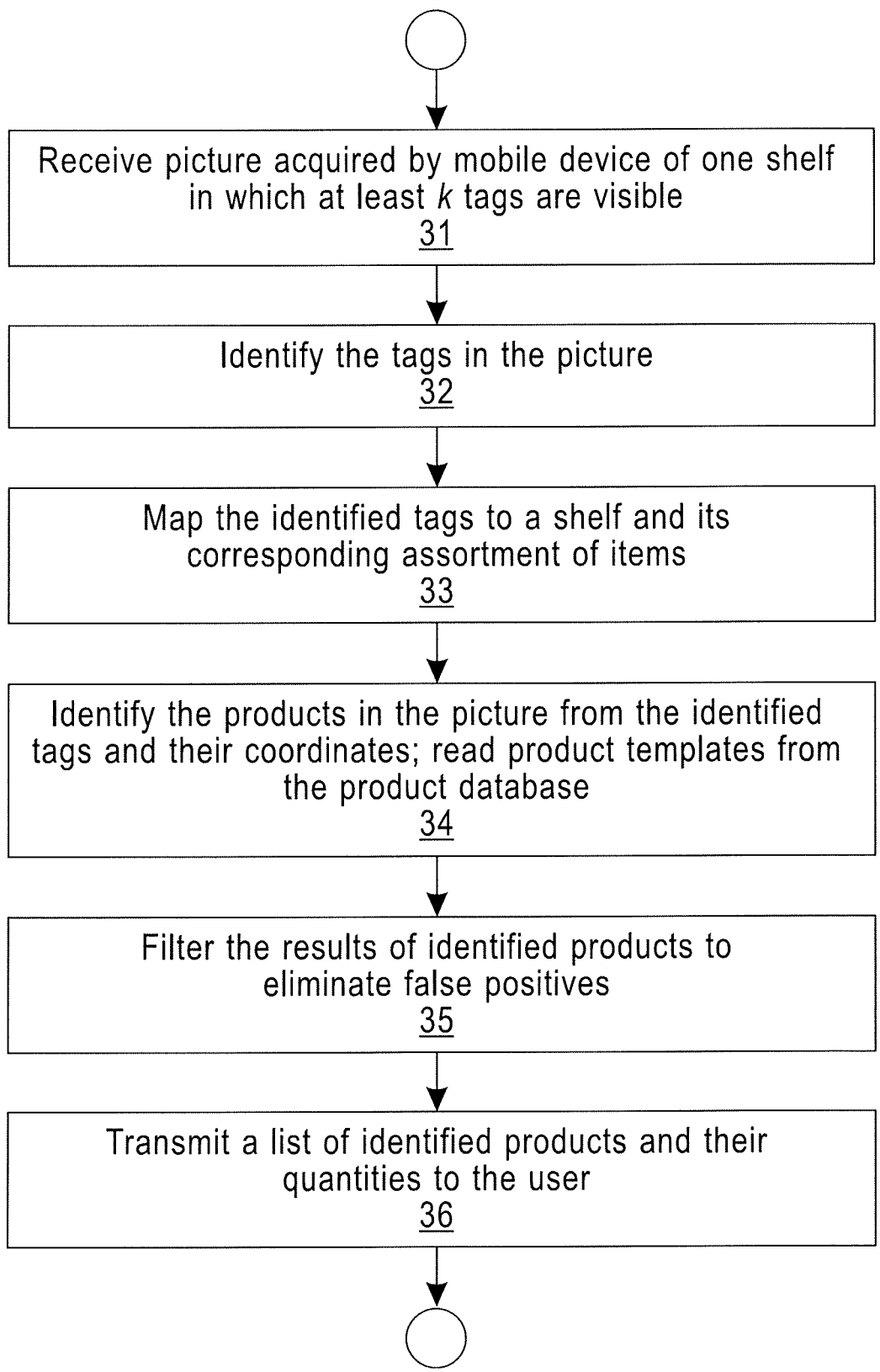
FIG. 3 is a flowchart of a method for identifying products on tagged shelves, according to an embodiment of the disclosure.

FIG. 3 is a flowchart of a method according to an embodiment of the disclosure for identifying products on tagged shelves. Referring now to the figure, at step 31, a picture is acquired by the mobile device of one shelf in which at least k tags are visible, and is transmitted to the remote server. The remote server calls the first image processing application at step 32 to identify the tags, and the identified tags and their coordinates, along with the picture, are passed to the second image processing application. The first image processing application uses the tag template and distribution information read from the tag database in identifying the tags. At step 33, the second image processing application uses the identified tags and their coordinates, along with the picture, to map the tags to a shelf and its corresponding assortment of items. The second image processing application reads product templates related to the identified tags from the product database to identify the products in the picture, at step 34. The second image processing application filters the results of identified products based on the product dimensions, to eliminate false positives at step 35, and transmits a list of identified products and its quantities to the user at step 36.

Figure 4:
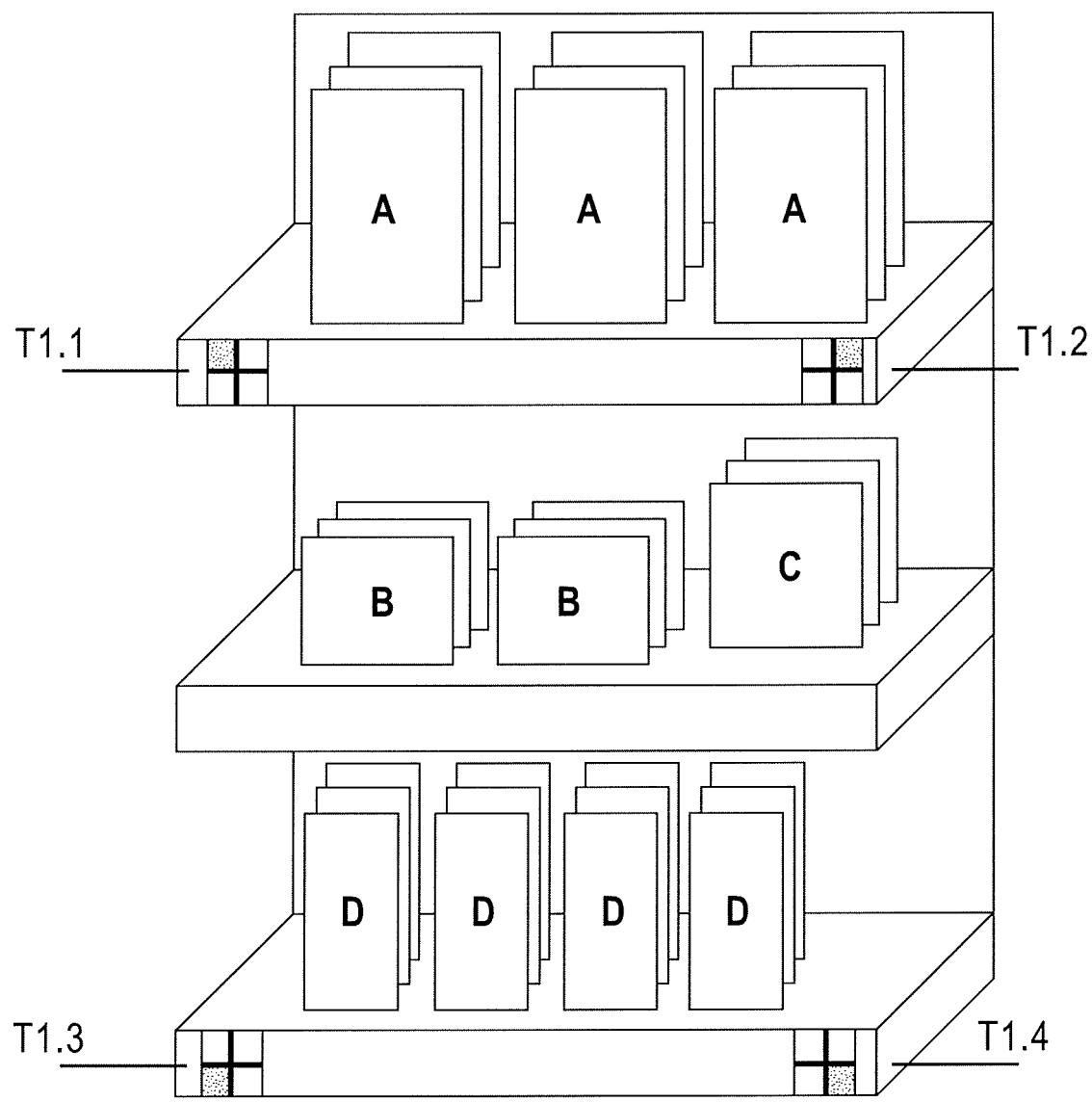
FIG. 4 shows an example of a shelf rack containing four types of products and four tags, according to an embodiment of the disclosure.
Figure 5:
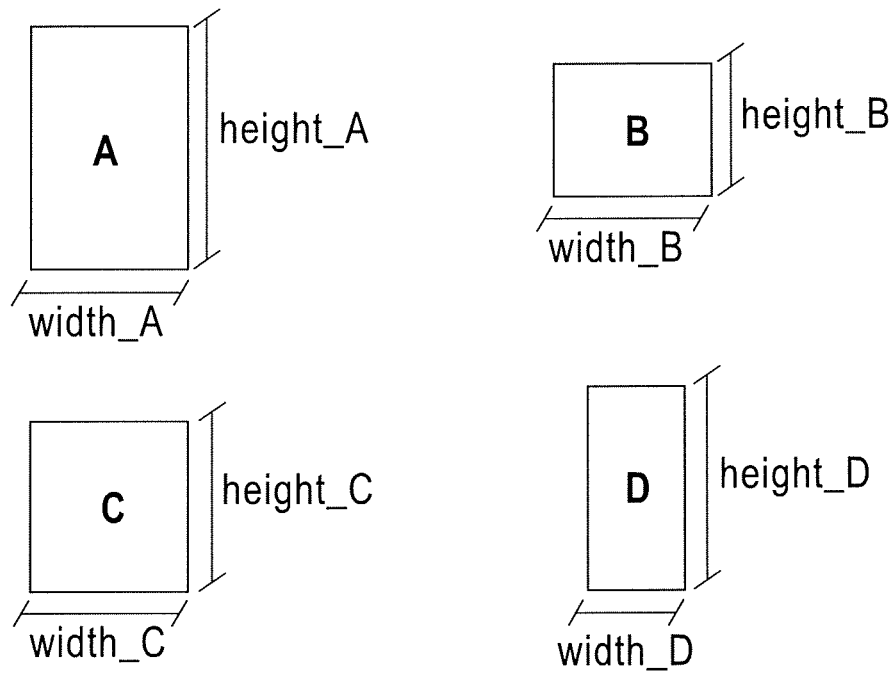
FIG. 5 shows the list of products for the shelf with corresponding picture and dimensions according to an embodiment of the disclosure.
Figure 6:
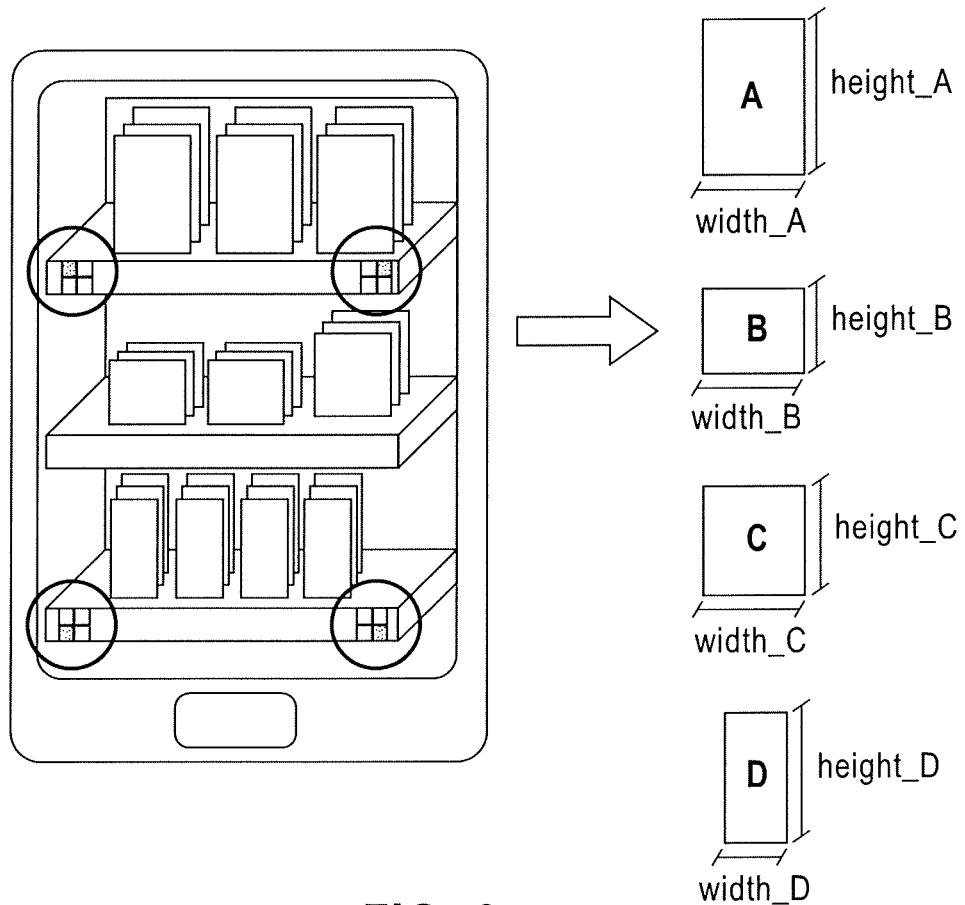
FIG. 6 shows a list of products associated with the current shelf retrieved from the product database, along with each product's associated width and height, according to an embodiment of the disclosure.
Figure 7:
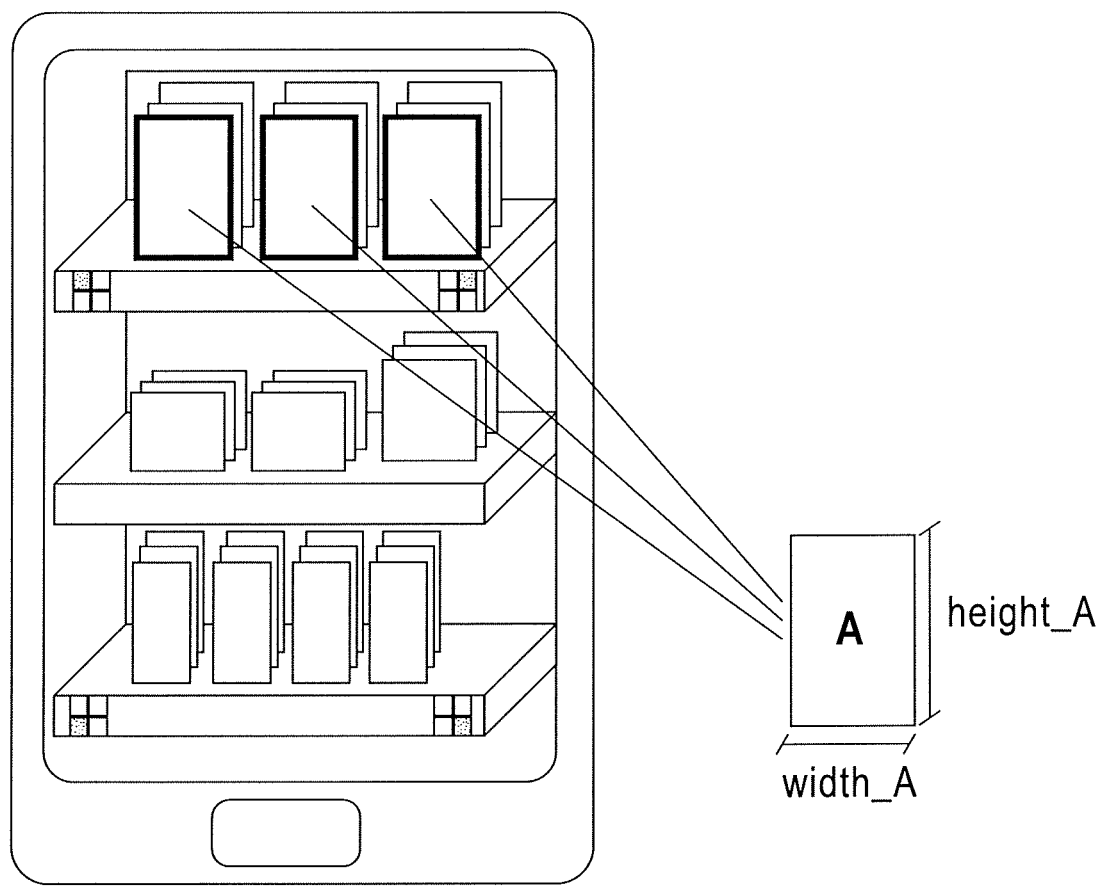
FIG. 7 illustrates the matching of the template to every item from the list in the image using the height and width information, according to an embodiment of the disclosure.

The following is an exemplary, non-limiting scenario of identifying products on tagged shelves. FIG. 4 shows an example of a shelf rack S1, containing four types of products A, B, C and D, and four tags T1.1, T1.2, T1.3 and T1.4. The distance of each tag to the others is measured and stored. Note that each tag T1.1, T1.2, T1.3 and T1.4 has a unique pattern, which enables the tag to be mapped to its location. FIG. 5 shows the list of products A, B, C, and D for the shelf S1, with corresponding picture and dimensions. The dimensions include a width and height of each product A, B, C, and D. When a user takes a picture of an arbitrary shelf, the first image-processing application identifies the current shelf from the tags, and then retrieves its list of products associated with the current shelf from the product database, along with each product's associated width and height, as illustrated in FIG. 6. After loading the templates for the current shelf, the second image-processing application attempts to match the template to every item from the list in the image using the height and width information, as shown in FIG. 7. Each detected product and its coordinates are then stored and sent to the user.

Figure 8:
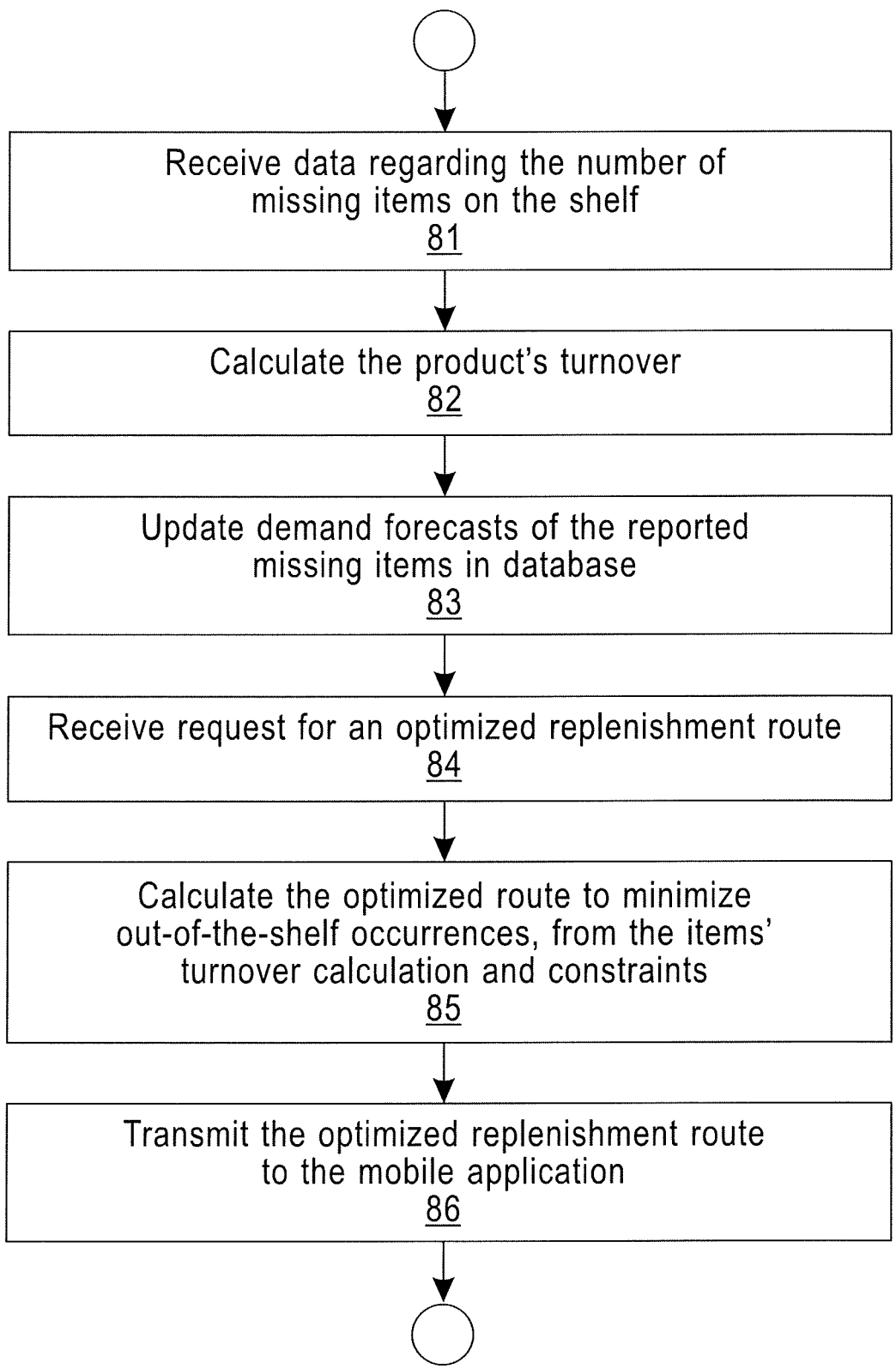
FIG. 8 is a flowchart of an exemplary, non-limiting method for minimizing out-of-the-shelf products based on data collected by mobile applications, according to an embodiment of the disclosure.

In a VIM model, a method to minimize out-of-the-shelf products based on data collected by mobile applications uses a database that stores a catalogue of each product and its location in the store. FIG. 8 is a flowchart of an exemplary, non-limiting method for minimizing a product's out-of-the-shelf time based on data collected by mobile applications. Referring to the figure, a method starts when the CPG employee provides information regarding the description, quantity, and location of missing items on each shelf of the store to the mobile application. The information can be entered manually by the employee or it can be extracted automatically from a picture taken of the shelf by the employee. At step 81, the product turnover application of the mobile application transmits the data collected regarding the number of missing items on the shelf to a remote server. The data may be in the form of a picture. After receiving the data, the retail store server calls the first sales trend calculation application to calculate the product's turnover, at step 82. The first sales trend calculation application updates demand forecasts of the reported missing items in the second database 16 at step 83. At step 84, after walking through the whole store and reposting all the missing items on the shelves, the CPG employee uses the optimal replenishment route request application to transmit a request for an optimized replenishment route to the to the retail store server. The retail store server receives the user's request through the network and calls the second sales trend calculation application to generate the optimized route, at step 85. The second sales trend calculation application generates an estimated optimized route to minimize out-of-the-shelf occurrences from the items' turnover calculation received from the first sales trend calculation application. At step 86, the optimized replenishment route is sent to the optimal replenishment route request application of the mobile application, which can display the replenishment order and items' quantity to be replenished to the user.

An exemplary, non-limiting example of minimizing out-of-the-shelf products based on data collected by mobile applications is as follows. A CPG employee makes a first patrol of the day and informs the mobile application that there are 20 packets of toiled paper missing, 14 packets of diapers missing and 30 napkin's packets missing. Since toilet paper historically has a greater turnover when compared to the other products, and since it has a higher priority (the profit margin is higher), the replenishment route calculation application prioritizes replenishment of toilet paper. However, the number of estimated diapers packets on the shelf is below a lower limit, as determined by the number of fronts in the shelf. On the other hand, the shopping chart can transport at most 15 packets of toilet paper and no diapers. A route optimization algorithm according to an embodiment of the disclosure, in turn, can determine that the employee makes two journeys: one with 12 packets of toilet paper and 3 diapers, assuring, this way, the number of fronts, and a second journey, with 8 toilet paper packets, 9 diapers and 30 napkins.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure has been described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
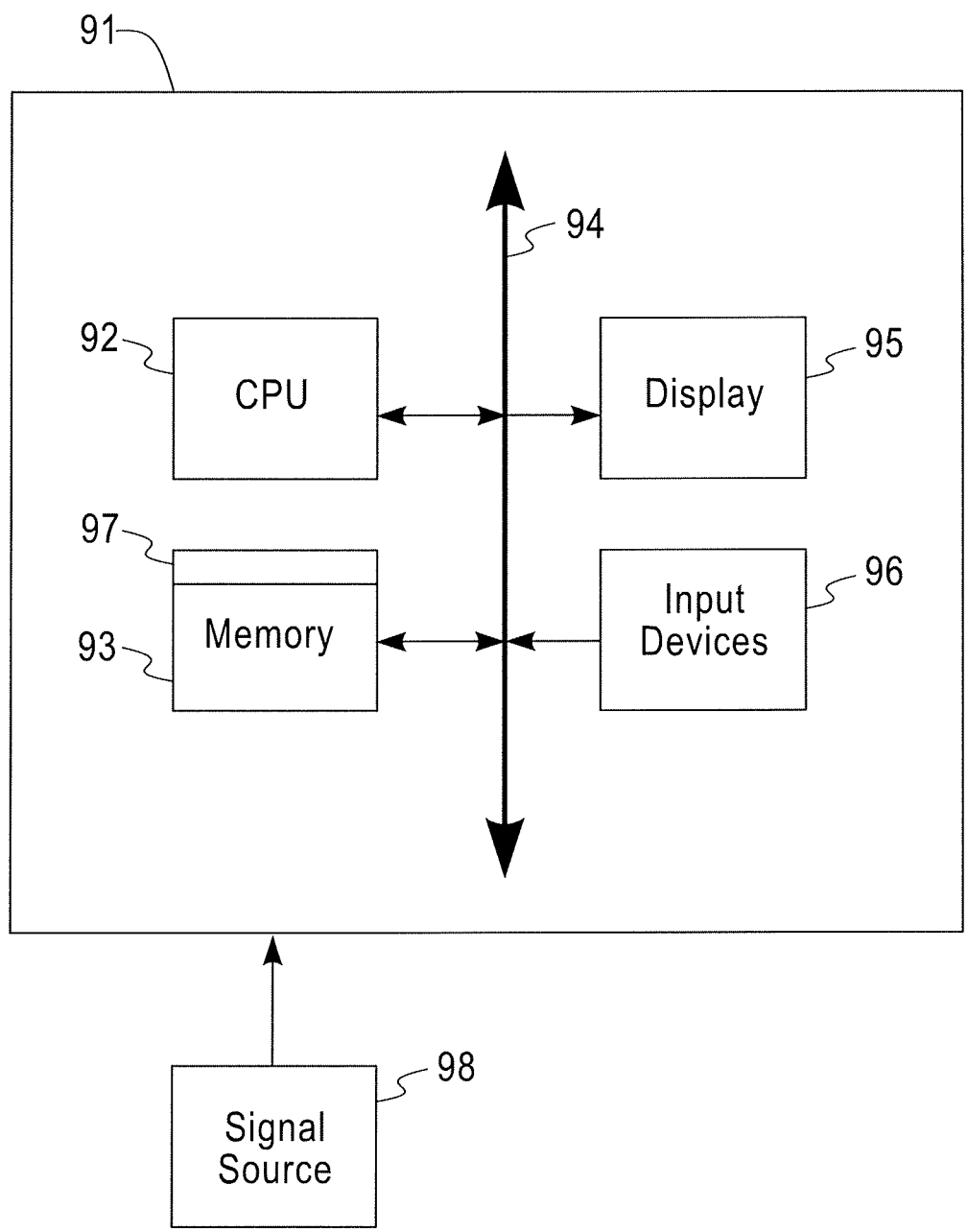
FIG. 9 is a block diagram of an exemplary computer system for implementing a method for managing inventory and sales trends in a retail environment using mobile devices according to an embodiment of the disclosure.

FIG. 9 is a block diagram of an exemplary computer system for implementing a method for managing inventory and sales trends in a retail environment using mobile devices according to an embodiment of the disclosure. Referring now to FIG. 9, a computer system 91 for implementing the present disclosure can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present disclosure can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present disclosure.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A non transitory program storage device readable by a computer, tangibly embodying a program of instructions executed by the computer to perform the method steps for managing inventory and sales trends in a retail environment using crowdsourcing by using mobile devices, the method comprising the steps of:
    receiving, by a retail store server, product availability data acquired by one or more mobile applications executing on mobile computing devices regarding a number of missing product items on a shelf in the retail store, wherein availability data is in the form of an image acquired of the product on the shelf;
    processing the image of the product to identify products on the shelf using tags attached to the shelves and distances between the tags, including identifying products missing from the shelves and the number of each available product on the shelf, wherein the tags are visible in the image of the product, and wherein the tags are not sensors and each tag has a distinctive pattern; and
    calculating turnover, sales velocity and sales trends of the identified product.

2. The computer readable program storage device of claim 1, wherein the method further comprises triggering a warning message if the retail store shelf is empty.

3. The computer readable program storage device of claim 1, wherein identifying products on the shelf using tags comprises the steps of:
    identifying the tags on the shelves using tag template intbrmation and information regarding a distribution of tags on the retail store shelves that is read from a tag database;
    mapping the identified tags to a shelf and its corresponding assortment of items;
    identifying products in the picture by reading product templates related to the identified tags from the product database; and
    transmitting a list of identified products and their quantities to the portable device.

4. The computer readable program storage device of claim 1, wherein calculating sales velocity and sales trends of the product comprises the steps of:
    receiving for each product p a timestamp t and a number of items n of product p on the retail store shelf, where the product information is organized as pairs p(t, n);
    ordering product pairs p(t, n) according to the timestamp t to generate an ordered sequence;
    calculating a least square line fit for the sequence to estimate a sales' velocity; and
    comparing changes in a slope of the line fits to determine a change in the sale's velocity over time.

5. The computer readable program storage device of claim 1, further comprising:
    transmitting the sales velocity and sales trend of the product to one or more third parties' systems in a supply chain of said retail store;
    receiving, by the retail store server, a request for an optimized replenishment route for an employee of the retail store to replenish the identified products in the shelves;
    generating an optimized replenishment route from the products' turnover calculation that minimizes out-of-the-shelf occurrences; and
    transmitting the optimized replenishment route to the mobile application for display to a user,
    wherein products and their locations on retail store shelves have been cataloged in a product database.

6. A system to calculate sales trend of a product at a store shelf based on crowdsourcing, comprising:
    at least one portable application configured to be executed on a plurality of portable computing devices;
    a plurality of tags attached to each store shelf rack, wherein the tags are not sensors, a location of each tag is knwon and each tag has a distinctive pattern; and
    a retail store server connected to the portable application on each of the plurality of portable computing devices over a wireless local network,
    wherein availability data of a product is measured on each store shelf rack by processing images of the product acquired by the at least one portable application using the tags attached to each store shelf rack, wherein the availability data includes missing product data and the number of each available product on the shelf wherein the tags are visible in the product images, and the retail store server is configured to determine sales trends of the product from the availability data received from the at least one portable application over the wireless local area network.

* * * * *